(12) United States Patent
Kou et al.

(10) Patent No.: US 12,356,051 B2
(45) Date of Patent: *Jul. 8, 2025

(54) BROADCAST CHANNEL TUNING PARAMETERS SUPPORT USING SWITCHED DIGITAL VIDEO DELIVERY

(71) Applicant: ARRIS Enterprises LLC, Horsham, PA (US)

(72) Inventors: Chuankai Kou, Shenzhen (CN); Wenwu Wei, Shenzhen (CN)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,888

(22) Filed: Jan. 25, 2024

(65) Prior Publication Data

US 2024/0205510 A1    Jun. 20, 2024

Related U.S. Application Data

(63) Continuation of application No. 17/716,943, filed as application No. PCT/CN2019/109975 on Oct. 8, 2019, now Pat. No. 11,917,261.

(51) Int. Cl.
*H04N 21/63* (2011.01)
*H04N 21/4425* (2011.01)
*H04N 21/6547* (2011.01)

(52) U.S. Cl.
CPC ....... *H04N 21/631* (2013.01); *H04N 21/4425* (2013.01); *H04N 21/6547* (2013.01)

(58) Field of Classification Search
CPC ............. H04N 21/631; H04N 21/4425; H04N 21/6547
See application file for complete search history.

(56) References Cited

U.S. PATENT DOCUMENTS

| 7,742,407 B2 * | 6/2010 | Versteeg | H04N 21/2385 370/468 |
| 9,554,166 B2 * | 1/2017 | Rieger | H04J 3/1682 |
| 2005/0235313 A1 | 10/2005 | Yamada et al. | |
| 2008/0244679 A1 | 10/2008 | Sukumar et al. | |

(Continued)

FOREIGN PATENT DOCUMENTS

CN    104581373 A    4/2015

OTHER PUBLICATIONS

International Search Report and Written Opinion RE: Application No. PCT/CN2019/109975, dated Jul. 8, 2020.

*Primary Examiner* — Mulugeta Mengesha
(74) *Attorney, Agent, or Firm* — Chernoff, Vilhauer, McClung & Stenzel, LLP

(57) ABSTRACT

In some embodiments, a method detects an issue with broadcast tuning parameters for broadcast channels being broadcast by a broadcast system. A message is received including a set of switched digital video tuning parameters for switched digital video channels from a switched digital video system where the broadcast tuning parameters are included in the message. The method retrieves at least a portion of the broadcast tuning parameters that are received via the switched digital video system and uses the at least a portion of the broadcast tuning parameters received in the message to request a broadcast channel from the broadcast system.

20 Claims, 6 Drawing Sheets

(56) References Cited

U.S. PATENT DOCUMENTS

2008/0271076 A1* 10/2008 Schlack ............. H04N 21/4408
                                                      725/38
2009/0077577 A1   3/2009  Allegrezza et al.
2015/0019465 A1   1/2015  Littlejohn et al.
2015/0106835 A1   4/2015  Bradley
2017/0289626 A1* 10/2017  Zelesko ........... H04N 21/44209

* cited by examiner

BROADCAST CHANNEL TUNING PARAMETERS SUPPORT USING SWITCHED DIGITAL VIDEO DELIVERY

CROSS-REFERENCE TO RELATED APPLICATIONS

The present application is a continuation of U.S. patent application Ser. No. 17/716,943, Apr. 8, 2022, which is a 371 of International PCT Patent Application No. PCT/CN2019/109975 filed on Oct. 8, 2019, the contents of which are incorporated by reference herein.

BACKGROUND

A broadcast system broadcasts channels of video to customer premise equipment. For a CPE to receive one of the broadcast channels, the CPE uses broadcast tuning parameters to tune to the broadcast channel to receive content being offered on the channel. The CPE typically receives the broadcast tuning parameters via a broadcast control component, such as an electronic program guide (EPG) server or equivalent component. When there is an issue, such as at the broadcast control component or in the network (e.g., at a network connection between the broadcast control component and an edge node), the subscriber device cannot retrieve the broadcast channel tuning parameters. Thus, the subscriber device may lose access to the broadcast channels.

DETAILED DESCRIPTION

Described herein are techniques for a video delivery system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A customer premises equipment (CPE) device may have a broadcast client and a switched digital video (SDV) client. The broadcast client is configured to request and receive broadcast channels and the switched digital video client is configured to request and receive switched digital video. The broadcast client requests and receives a broadcast channel using broadcast channel tuning parameters and the switched digital video client requests and receives a switched digital video channel using switched digital video tuning parameters. Typically, the broadcast tuning parameters and the switched digital video tuning parameters are sent via different protocols, different systems, and at different frequency ranges.

When an issue occurs such that the CPE cannot receive the broadcast tuning parameters from the broadcast control component, the CPE may use broadcast tuning parameters that are sent via the switched digital video tuning parameters. For example, a switched digital video control component may add the broadcast tuning parameters to a message that is being used to send the switched digital video tuning parameters. Then, the CPE may retrieve the broadcast tuning parameters that are sent via switched digital video tuning parameters and use those broadcast tuning parameters to request a broadcast channel. Accordingly, the broadcast client can still receive broadcast channels when an issue occurs with the broadcast control component.

System

Figure 1:
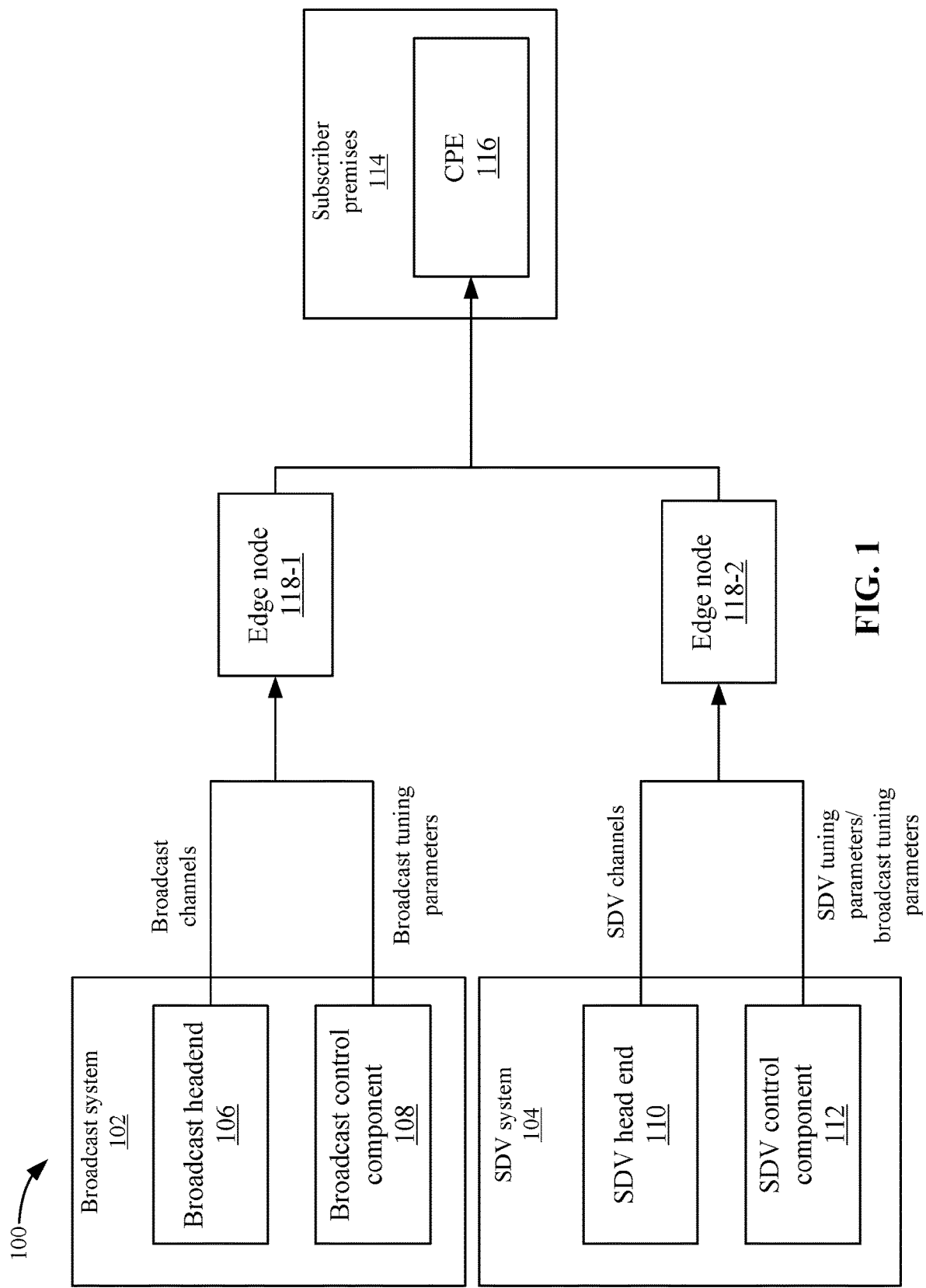
FIG. 1 depicts a simplified system for receiving broadcast channels and switched digital video channels according to some embodiments.

FIG. 1 depicts a simplified system 100 for receiving broadcast channels and switched digital video channels according to some embodiments. System 100 includes a broadcast system 102, a switched digital video (SDV) system 104, and subscriber premises 114. It is noted that broadcast system 102 and switched digital video system 104 may be connected to multiple subscriber premises 114 and CPEs 116.

CPE 116 may include various subscriber devices, such as set-top boxes, cable modems, gateways, etc. Broadcast system 102 may broadcast channels of video to CPE 116, such as a broadcast headend 106 sends the broadcast channels to CPE 116. The channels may carry linear broadcasts of programs and every broadcast channel is always available on the network for CPE 116 to tune to and request. However, switched digital video refers to an arrangement where broadcast channels are only switched onto a network when the broadcast channels are requested by one or more subscribers, such as one or more CPE 116 in a service group, which is a group of subscribers that are served by a network segment. This allows a system operator to save bandwidth over the distribution network because a switched digital video channel is only available when requested by CPE 116. Unlike video-on-demand, which switches a single-cast interactive program to a specific subscriber, switched digital video switches broadcast streams making each streams available to one or more CPE 116 that can join the broadcast stream, just as it would a normal broadcast channel. That is, once a switched digital video channel is sent to CPE 116, other CPE 116, such as CPE associated with a same service group, can tune to the same broadcast stream offered by the switched digital video channel. Switched digital video allows a service provider to provide broadcast channels that are being watched by subscribers and those channels not requested by subscribers do not need to be broadcast, which saves bandwidth.

Broadcast system 102 and switched digital video system 104 will be described as separate systems, but may be implemented in the same computing device. A broadcast headend 106 may send broadcast channels to CPE 116 via an edge node 118-1. Additionally, a broadcast control component 108 may send broadcast tuning parameters via edge node 118-1 to CPE 116. The broadcast tuning parameters are parameters that CPE 116 uses to tune to a broadcast channel such that CPE 116 can receive a video from that broadcast channel. Broadcast control component 108 may be an electronic program guide (EPG) server or an equivalent component. In some embodiments, broadcast tuning parameters are sent via a first frequency spectrum or range. Broadcast channels are also sent via the first frequency spectrum.

Switched digital video system 104 includes a switched digital video (SDV) headend 110 that sends switched digital video channels to CPE 116 via edge node 118-2. Although different edge nodes 118 are described, it will be understood that the same edge node 118 may be used to send broadcast channels and switched digital video channels to CPE 116. However, different protocols may be used in addition to switched digital video is sent using a different frequency spectrum than the broadcast video. Broadcast system 102 and switched digital video system 104 may be separate systems, but may be implemented in the same computing device.

A switched digital video control component 112 sends switched digital video tuning parameters to CPE 116 via edge node 118-2. The switched digital video tuning parameters allow CPE 116 to request switched digital video channels. Switched digital video control component 112 may be a switched digital video provisioning server or equivalent component. SDV control component 112 sends the switched digital video tuning parameters via a second frequency spectrum or range that is different from the first frequency spectrum in which the broadcast tuning parameters are sent. Also, SDV control component 112 uses a different protocol to send the switched digital video tuning parameters compared to the protocol used to send the broadcast tuning parameters. For example, broadcast system 102 may use a first protocol to send the broadcast tuning parameters and switched digital video system 104 may use a second protocol to send the SDV tuning parameters. The switched digital video channels are also sent via the second frequency range.

As discussed above, CPE 116 may encounter an issue that affects the reception of the broadcast tuning parameters. To overcome the issue, switched digital video control component 112 may include broadcast tuning parameters with the switched digital video tuning parameters. For example, SDV control component 112 sends a management message that includes the switched digital video tuning parameters and also includes the broadcast tuning parameters in the management message. CPE 116 can then leverage the broadcast tuning parameters in the management message to request broadcast channels when an issue occurs with receiving broadcast tuning parameters from broadcast control component 108. As will be described in more detail below, the switched digital video tuning parameters may be provided in a switched digital video mini carousel message that is defined by a protocol. The mini carousel message may be sent between the switched digital video control component 112 and CPE 116.

CPE

Figure 2:
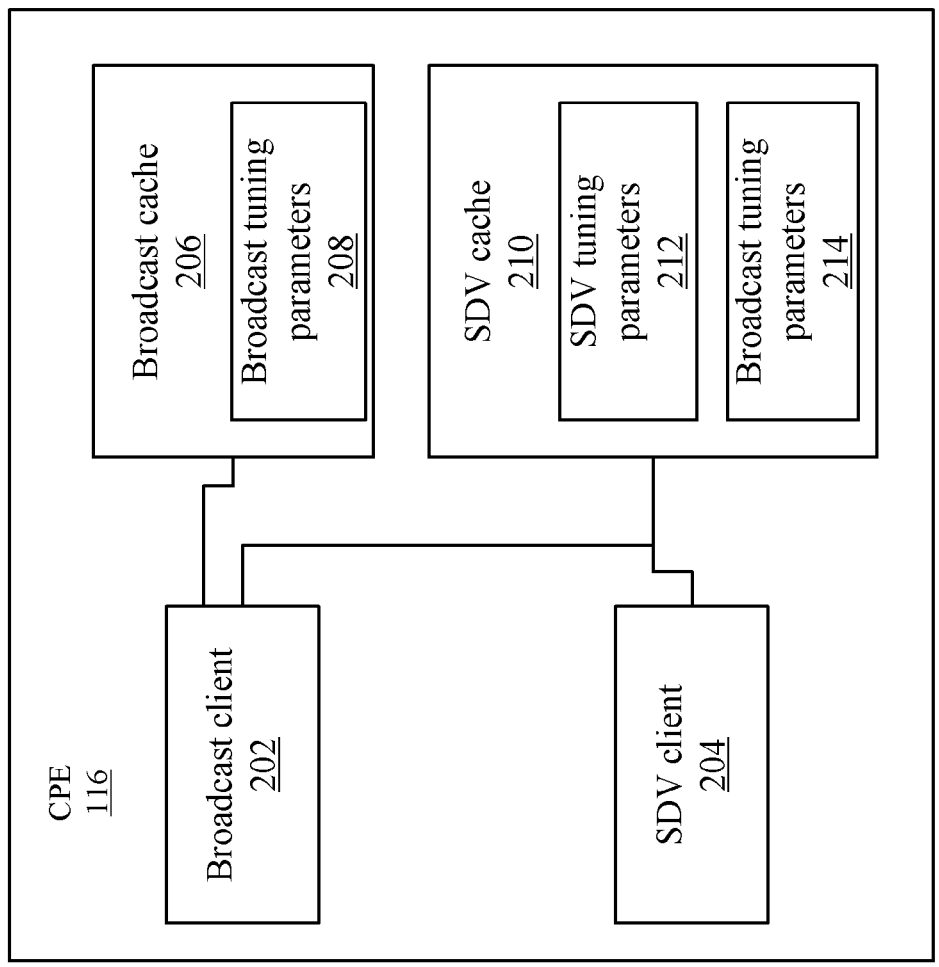
FIG. 2 depicts a more detailed example of customer premises equipment according to some embodiments.

FIG. 2 depicts a more detailed example of CPE 116 according to some embodiments. CPE 116 includes a broadcast client 202 and a switched digital video client 204. Broadcast client 202 is configured to communicate with broadcast control component 108 to receive broadcast tuning parameters and switched digital video client 204 is configured to communicate with switched digital video control component 112 to receive switched digital video tuning parameters and broadcast tuning parameters. CPE 116 also includes a broadcast cache 206 and a switched digital video cache 210. Broadcast cache 206 is storage that stores recently received broadcast tuning parameters at 208 and switched digital video cache 210 is storage that stores switched digital video tuning parameters at 212 and broadcast tuning parameters at 214.

In some embodiments, broadcast client 202 receives the broadcast channels via a Data Over Cable Service Interface Specification (DOCSIS) protocol. Switched digital video client 204 receives the switched digital video channels using an Internet protocol (IP). Accordingly, CPE 116 may include both broadcast client 202 and a switched digital video client 204 because different protocols are used and separate systems are needed.

Figure 3:
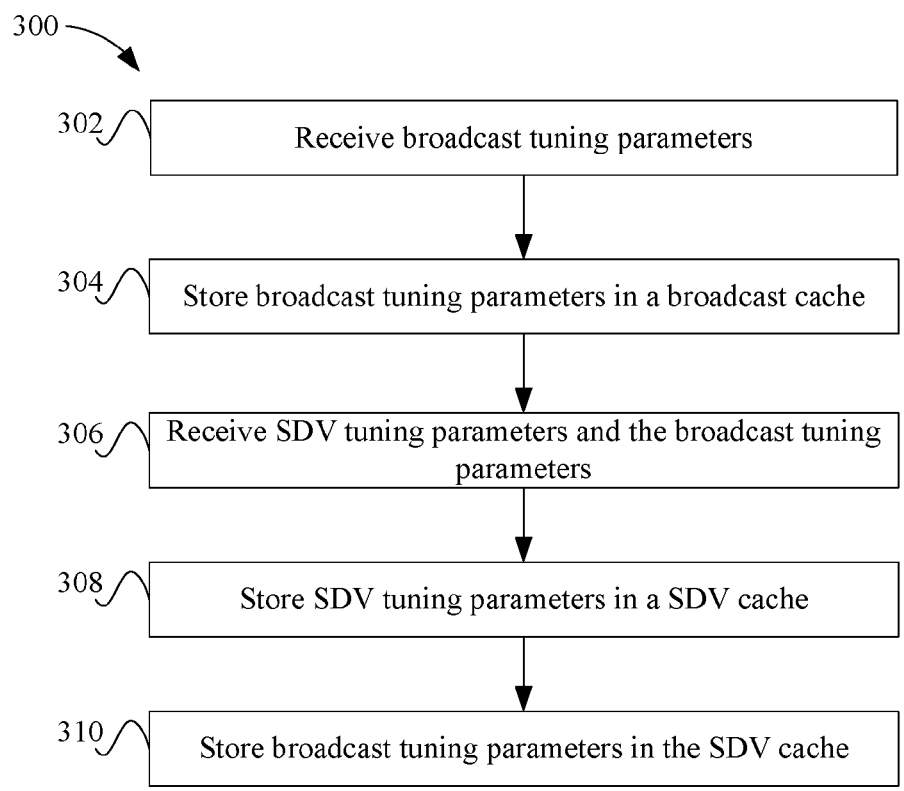
FIG. 3 depicts a simplified flowchart of a method for processing broadcast tuning parameters and switched digital video tuning parameters according to some embodiments.

FIG. 3 depicts a simplified flowchart 300 of a method for processing broadcast tuning parameters and switched digital video tuning parameters according to some embodiments. At 302, broadcast client 202 receives broadcast tuning parameters in a first frequency spectrum, such as a frequency spectrum reserved for broadcast channel quadrature amplitude modulation (QAM) frequencies. For example, the broadcast tuning parameters may include a modulation mode, a carrier frequency, a program number, a service type, and a source identifier, which broadcast client 202 uses to tune to the broadcast channel to receive the video. At 304, broadcast client 202 may store broadcast tuning parameters at 208 in a broadcast cache 206. Then, broadcast client 202 can use the broadcast tuning parameters to tune to broadcast channels to receive video offered by a broadcast channel. The broadcast tuning parameters in broadcast cache 206 may remain valid for a period of time. However, at some point, the broadcast tuning parameters may change, such as the broadcast tuning parameters for a channel may change. Thus, if CPE 116 uses broadcast tuning parameters in broadcast cache 206 that may have changed, an error may result and CPE 116 may not receive the broadcast channel. That is, after an issue occurs with receiving the broadcast tuning parameters, the broadcast tuning parameters in broadcast cache 206 may allow broadcast client 202 to request broadcast channels for a time period, but then the broadcast tuning parameters may become invalid and need to be refreshed.

At 306, switched digital video client 204 receives switched digital video tuning parameters along with the broadcast tuning parameters in a second frequency spectrum. For example, switched digital video client 204 may receive a mini carousel message in a frequency spectrum reserved for switched digital video frequencies, such as switched digital video QAM frequencies. Switched digital video client 204 receives the mini carousel message and can extract the switched digital video tuning parameters. The mini carousel message includes a current list of switched digital video program channels with tuning parameters. Programs are included on the switched digital video channels and placed in the table by switched digital video control component 112. Some of the switched digital video parameters include a program number, a program map table, a program map table program clock reference, a program map table referenced to the mini carousel, and a mini carousel program ID. At 308, switched digital video client 204 extracts the switched digital video tuning parameters and can store the switched digital video parameters in a storage device, such as switched digital video cache 210. When a mini carousel message is received, switched digital video client 204 may check the version number of the program map that lists the programs offered by switched digital video head end 110 and determine if the program map has changed. If so, switched digital video client 204 updates the switched digital video tuning parameters at 212 in switched digital video cache 210.

Switched digital video client 204 also parses the management message to determine the broadcast tuning parameters. Switched digital video client 204 may distinguish the switched digital video parameters from the broadcast tuning parameters based on different methods. For example, a flag may indicate which parameters are broadcast tuning parameters. Then, at 310, switched digital video client 204 stores the broadcast tuning parameters in switched digital video cache 210. In some examples, both broadcast cache 206 and switched digital video cache 210 may be storing the same broadcast tuning parameters.

Use of Broadcast Tuning Parameters in Switched Digital Video Cache

Figure 4:
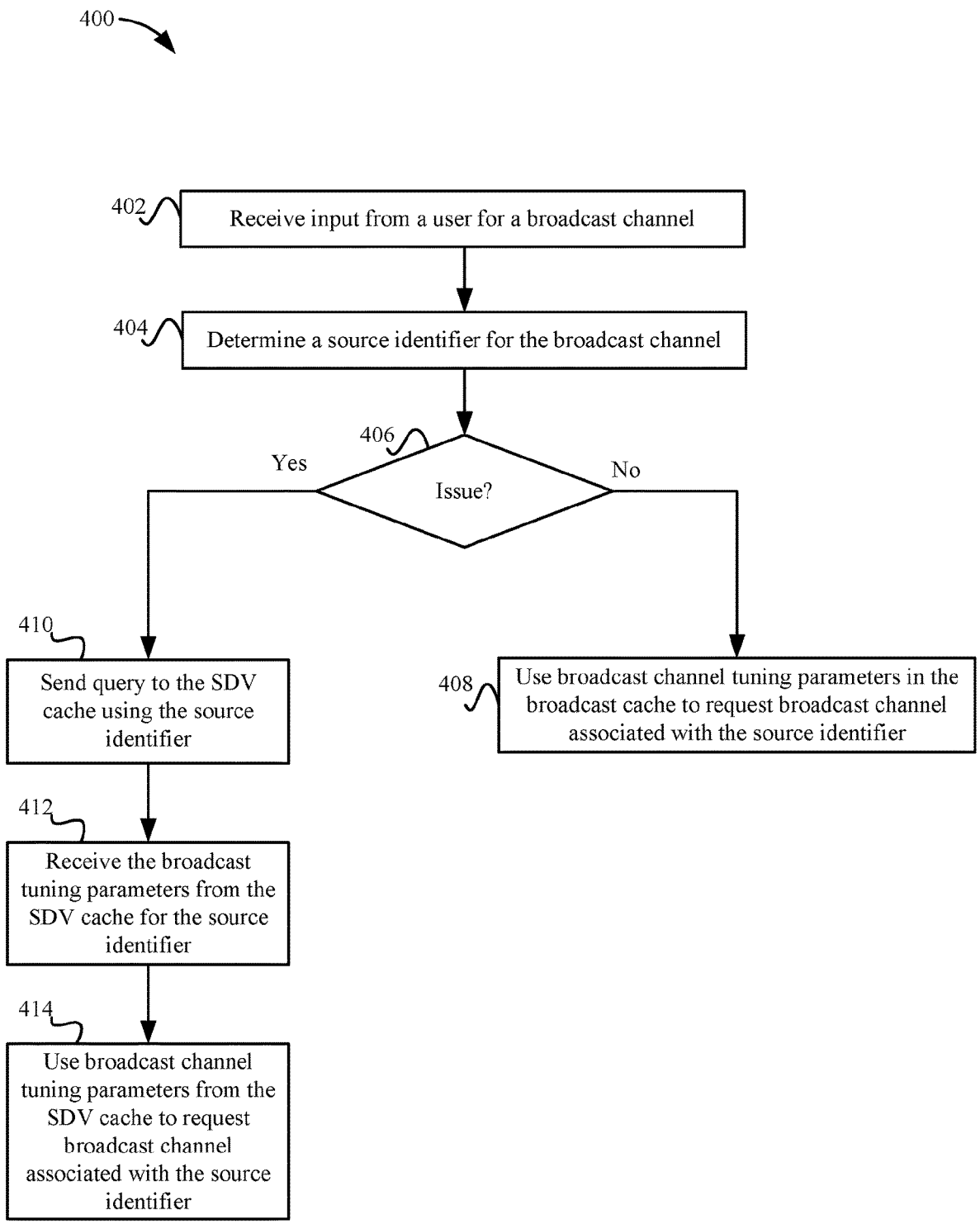
FIG. 4 depicts a simplified flowchart of a method for using broadcast tuning parameters stored in a switched digital video cache when an issue occurs according to some embodiments.

Once broadcast tuning parameters are stored in switched digital video cache 210, broadcast client 202 may access the broadcast channels using the broadcast tuning parameters stored in switched digital video cache 210 when an issue occurs. FIG. 4 depicts a simplified flowchart 400 of a method for using broadcast tuning parameters stored in switched digital video cache 210 when an issue occurs according to some embodiments. At 402, broadcast client 202 receives input from a user for a broadcast channel. For example, a user may select a channel that the user wants to view via a remote control. Then, at 404, broadcast client 202 determines a source identifier for the broadcast channel. The source identifier may uniquely identify the broadcast channel. For example, each broadcast channel may include a different source identifier.

At 406, broadcast client 202 determines if an issue has occurred with the broadcast tuning parameters. For example, an issue may occur that prevents CPE 116 from receiving broadcast tuning parameters from broadcast control component 108, such as broadcast control component 108 may have suffered an outage and cannot send the current broadcast tuning parameters or the network between broadcast control component 108 and edge node 118-1 may be down and the current broadcast tuning parameters that are sent are not being received. Further, there may be a problem with broadcast cache 206 in that the broadcast tuning parameters 208 in broadcast cache 206 may be out of date. For example, broadcast client 202 may use the broadcast tuning parameters in broadcast cache 206 to request the broadcast channel, but broadcast client 202 receives an error instead of receiving content for the broadcast channel.

If an issue is not occurring, however, at 408, broadcast client 202 uses broadcast channel tuning parameters in broadcast cache 206 to request the broadcast channel associated with the source identifier. For example, broadcast client 202 uses broadcast tuning parameters from broadcast headend 206 that include a modulation mode, a carrier frequency, a program number, a service type, and a source identifier to request and receive the video from the channel.

However, if broadcast client 202 determines an issue has occurred, at 410, broadcast client 202 sends a query to switched digital video cache 210 using the source identifier. For example, broadcast tuning parameters in switched digital video cache 210 may be stored based on source identifiers for the broadcast channels in the same way the broadcast tuning parameters are stored in broadcast cache 206.

At 412, broadcast client 202 may receive the broadcast tuning parameters from switched digital video cache 210 for the source identifier. For example, switched digital video client 204 may be receiving up-to-date broadcast tuning parameters in the management message along with the switched digital video tuning parameters. Switched digital video client 204 then updates the broadcast tuning parameters in switched digital video cache 210. Accordingly, the broadcast tuning parameters stored in switched digital video cache 210 may be more up-to-date than the broadcast tuning parameters stored in broadcast cache 206. Video for the broadcast channels may still be delivered by broadcast headend 106 and CPE 116 can be requested from edge node 118-1 even though an issue is occurring with the broadcast tuning parameters. Thus, at 414, broadcast client 202 uses the broadcast tuning parameters from switched digital video cache 210 to request the broadcast channel associated with the source identifier.

Switched Digital Video Management Message Configuration

Figure 5:
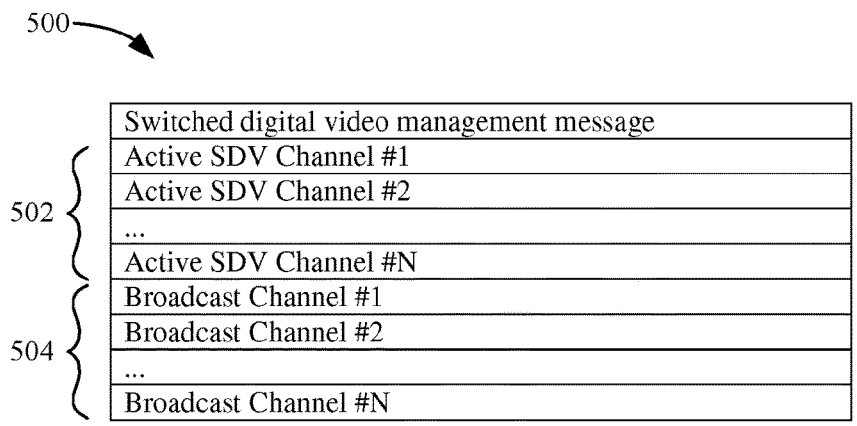
FIG. 5 depicts an example of a switched digital video management message according to some embodiments.

The switched digital video management message may be based on a protocol that defines how to send switched digital video tuning parameters. In some embodiments, a mini carousel syntax is defined by the protocol to send the switched digital video tuning parameters. In some embodiments, a Time Warner Cable Switched Digital Video Mini Carousel Message Interface Specification may be used. FIG. 5 depicts an example 500 of a switched digital video management message according to some embodiments. Switched digital video management message 500 includes a first section 502 that includes tuning parameters for active switched digital video channels #1 to #N. The active switched digital video channels may be the switched digital video channels that are currently being offered by switched digital video system 104. For example, not all switched digital video channels may be offered at once as described above.

At 504, switched digital video management message includes a second section that lists the broadcast tuning parameters for broadcast channels #1 to #N. These are the same broadcast tuning parameters that are sent using a message from broadcast control component 108.

Figure 6:
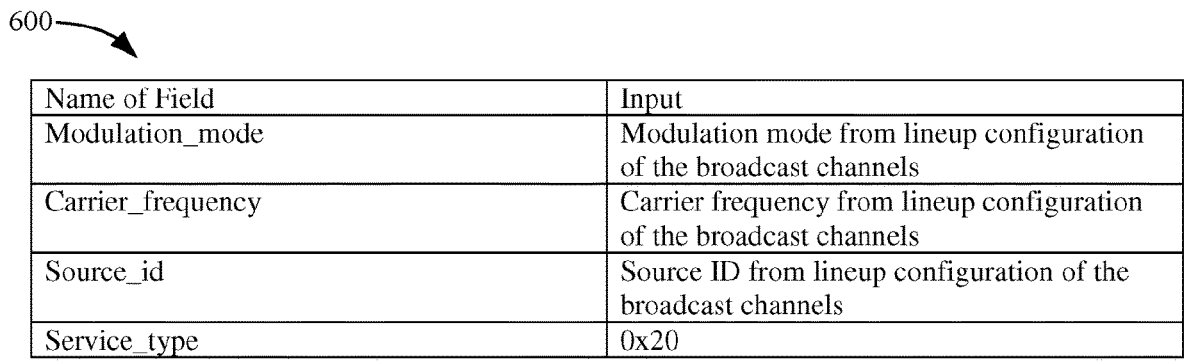
FIG. 6 depicts a table that describes broadcast tuning parameters that are included in the switched digital video management message according to some embodiments.

FIG. 6 depicts a table 600 that describes broadcast tuning parameters that are included in the switched digital video management message according to some embodiments. The name of the field in table 600 includes the fields that may be included in the broadcast tuning parameters in the switched digital video management message. In some embodiments, the broadcast tuning parameters include a modulation_mode parameter, a carrier_frequency parameter, a source_ID parameter, and a service_type parameter. These are the broadcast tuning parameters that broadcast client 202 requires to request a broadcast channel. Although these parameters are discussed, other parameters may be included. Broadcast client 202 is configured to receive the modulation_mode parameter, carrier_frequency parameter, source_ID parameter, and service_type parameter and request the broadcast channel associated with the source ID by adding the information.

The modulation_mode parameter describes the modulation mode from the line-up configuration from the broadcast channels. The modulation mode may be a QAM64 modulation mode or a QAM256 modulation mode. The line-up configuration is the line-up of broadcast channels that are being offered by broadcast system 102. The carrier_frequency describes carrier frequency from the line-up configuration of the broadcast channel. The carrier frequency is a QAM carrier frequency and may be defined in Hertz (Hz). Different broadcast channels may use a modulation mode and be delivered on different frequencies. The source_ID parameter is the source identifier from the line-up configuration of the broadcast channels. The service_type parameter may indicate that these are static channels that do not change and is set to "0x20".

Conclusion

Accordingly, when an issue occurs with broadcast tuning parameters, CPE 116 can use broadcast tuning parameters that are sent with switched digital video tuning parameters. This allows CPE 116 to continue to receive broadcast channels when broadcast channels are still being broadcast even though an issue is occurring with the broadcast tuning parameters from broadcast control component 108.

System

Figure 7:
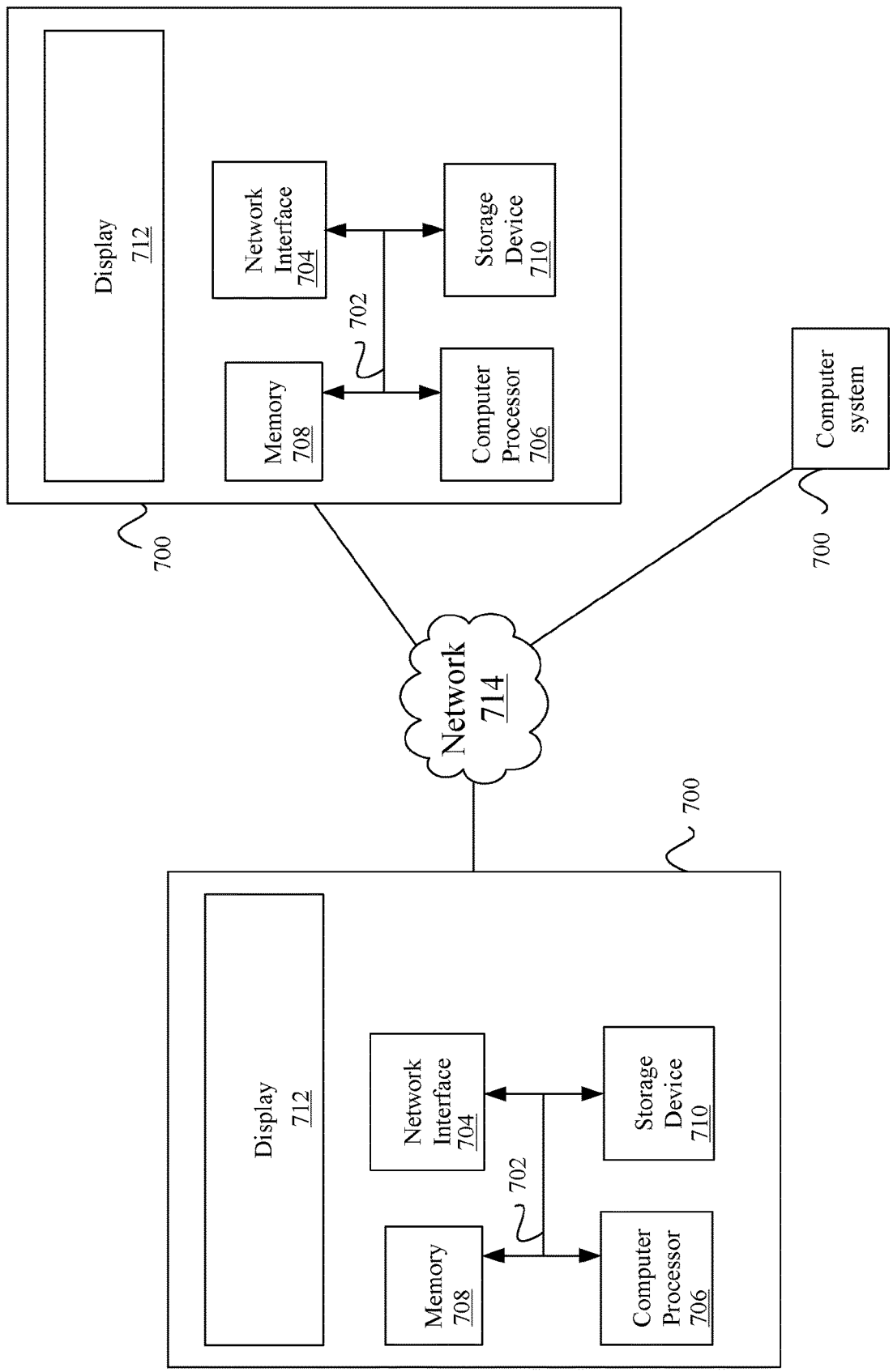
FIG. 7 illustrates an example of special purpose computer systems according to some embodiments.

FIG. 7 illustrates an example of special purpose computer systems 700 according to some embodiments. Computer system 700 includes a bus 702, network interface 704, a computer processor 706, a memory 708, a storage device 710, and a display 712.

Bus 702 may be a communication mechanism for communicating information. Computer processor 706 may execute computer programs stored in memory 708 or storage device 710. Any suitable programming language can be used to implement the routines of some embodiments including C, C++, Java, assembly language, etc. Different programming techniques can be employed such as procedural or object oriented. The routines can execute on a single computer system 700 or multiple computer systems 700. Further, multiple computer processors 706 may be used.

Memory 708 may store instructions, such as source code or binary code, for performing the techniques described above. Memory 708 may also be used for storing variables or other intermediate information during execution of instructions to be executed by processor 706. Examples of memory 708 include random access memory (RAM), read only memory (ROM), or both.

Storage device 710 may also store instructions, such as source code or binary code, for performing the techniques described above. Storage device 710 may additionally store data used and manipulated by computer processor 706. For example, storage device 710 may be a database that is accessed by computer system 700. Other examples of storage device 710 include random access memory (RAM), read only memory (ROM), a hard drive, a magnetic disk, an optical disk, a CD-ROM, a DVD, a flash memory, a USB memory card, or any other medium from which a computer can read.

Memory 708 or storage device 710 may be an example of a non-transitory computer-readable storage medium for use by or in connection with computer system 700. The non-transitory computer-readable storage medium contains instructions for controlling a computer system 700 to be configured to perform functions described by some embodiments. The instructions, when executed by one or more computer processors 706, may be configured to perform that which is described in some embodiments.

Computer system 700 includes a display 712 for displaying information to a computer user. Display 712 may display a user interface used by a user to interact with computer system 700.

Computer system 700 also includes a network interface 704 to provide data communication connection over a network, such as a local area network (LAN) or wide area network (WAN). Wireless networks may also be used. In any such implementation, network interface 704 sends and receives electrical, electromagnetic, or optical signals that carry digital data streams representing various types of information.

Computer system 700 can send and receive information through network interface 704 across a network 714, which may be an Intranet or the Internet. Computer system 700 may interact with other computer systems 700 through network 714. In some examples, client-server communications occur through network 714. Also, implementations of some embodiments may be distributed across computer systems 700 through network 714.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
    detecting, by a computing device, an issue with broadcast tuning parameters for broadcast channels being broadcast by a broadcast system;
    receiving, by the computing device, a message including a set of switched digital video tuning parameters for switched digital video channels from a switched digital video system, wherein the broadcast tuning parameters are included in the message;
    retrieving, by the computing device, at least a portion of the broadcast tuning parameters that are received via the switched digital video system; and
    using, by the computing device, the at least a portion of the broadcast tuning parameters received in the message to request a broadcast channel from the broadcast system.

2. The method of claim 1, wherein:
    a broadcast client detects the issue, retrieves the at least the portion of the broadcast tuning parameters, and uses the at least the portion of the broadcast tuning parameters to request the broadcast channel, and
    a switched digital video client receives the message including the broadcast tuning parameters.

3. The method of claim 1, further comprising:
    before detecting the issue, receiving the broadcast tuning parameters from the broadcast system, wherein the broadcast tuning parameters are invalid for requesting the broadcast channel.

4. The method of claim 1, wherein detecting the issue comprises:
    detecting the issue from a component of the broadcast system that sends the broadcast tuning parameters.

5. The method of claim 1, wherein detecting the issue comprises:
detecting that a cache that stores the broadcast tuning parameters does not have the at least the portion of the broadcast tuning parameters that are required to request the broadcast channel.

6. The method of claim 1, further comprising:
receiving a first set of the broadcast tuning parameters at a broadcast client;
determining that the first set of broadcast tuning parameters cannot be used to request the broadcast channel;
receiving a second set of the broadcast tuning parameters at a switched digital video client; and
retrieving the at least the portion of the broadcast tuning parameters from the second set of broadcast tuning parameters.

7. The method of claim 6, wherein:
the first set of broadcast tuning parameters are received via a first protocol, and
the second set of broadcast tuning parameters are received via a second protocol.

8. The method of claim 6, further comprising:
storing the first set of broadcast tuning parameters in a first storage location; and
storing the second set of broadcast tuning parameters in a second storage location, wherein the second storage location includes the switched digital video tuning parameters.

9. The method of claim 6, wherein:
the first set of broadcast tuning parameters are received in a first frequency spectrum, and
the second set of broadcast tuning parameters are received in a second frequency spectrum.

10. The method of claim 1, wherein retrieving the at least the portion of the broadcast tuning parameters that are received via the switched digital video system comprises:
using a source identifier for the broadcast channel to retrieve the at least the portion of the broadcast tuning parameters that are received via the switched digital video system.

11. The method of claim 1, wherein the at least the portion of the broadcast tuning parameters comprises parameters needed to request the broadcast channel.

12. The method of claim 1, wherein the at least the portion of the broadcast tuning parameters comprises a modulation mode parameter to identify a modulation mode of the broadcast channel, a source identifier to identify the broadcast channel, and a carrier frequency for the broadcast channel.

13. The method of claim 1, wherein the message lists the switched digital video parameters for active switched digital video channels and the broadcast tuning parameters for broadcast channels being offered.

14. The method of claim 1, wherein the broadcast channel is being broadcast while the issue with the broadcast tuning parameters is occurring.

15. A non-transitory computer-readable storage medium containing instructions that, when executed, control a computer system to be operable for:
detecting an issue with broadcast tuning parameters for broadcast channels being broadcast by a broadcast system;
receiving a message including a set of switched digital video tuning parameters for switched digital video channels from a switched digital video system, wherein the broadcast tuning parameters are included in the message;
retrieving at least a portion of the broadcast tuning parameters that are received via the switched digital video system; and
using the at least a portion of the broadcast tuning parameters received in the message to request a broadcast channel from the broadcast system.

16. The non-transitory computer-readable storage medium of claim 15, wherein:
a broadcast client detects the issue, retrieves the at least the portion of the broadcast tuning parameters, and uses the at least the portion of the broadcast tuning parameters to request the broadcast channel, and
a switched digital video client receives the message including the broadcast tuning parameters.

17. The non-transitory computer-readable storage medium of claim 16, further operable for:
before detecting the issue, receiving the broadcast tuning parameters from the broadcast system, wherein the broadcast tuning parameters are invalid for requesting the broadcast channel.

18. The non-transitory computer-readable storage medium of claim 15, further operable for:
receiving a first set of the broadcast tuning parameters at a broadcast client;
determining that the first set of broadcast tuning parameters cannot be used to request the broadcast channel;
receiving a second set of the broadcast tuning parameters at a switched digital video client; and
retrieving the at least the portion of the broadcast tuning parameters from the second set of broadcast tuning parameters.

19. The non-transitory computer-readable storage medium of claim 18, wherein:
the first set of broadcast tuning parameters are received via a first protocol, and
the second set of broadcast tuning parameters are received via a second protocol.

20. An apparatus comprising:
one or more computer processors; and
a non-transitory computer-readable storage medium comprising instructions, that when executed, control the one or more computer processors to be operable for:
detecting an issue with broadcast tuning parameters for broadcast channels being broadcast by a broadcast system;
receiving a message including a set of switched digital video tuning parameters for switched digital video channels from a switched digital video system, wherein the broadcast tuning parameters are included in the message;
retrieving at least a portion of the broadcast tuning parameters that are received via the switched digital video system; and
using the at least a portion of the broadcast tuning parameters received in the message to request a broadcast channel from the broadcast system.

* * * * *